Nov. 8, 1966 H. SOMMER 3,283,361
SAUSAGE STUFFING MACHINE
Filed Nov. 17, 1964 2 Sheets-Sheet 1

INVENTOR
HANS SOMMER
BY
ATTORNEY

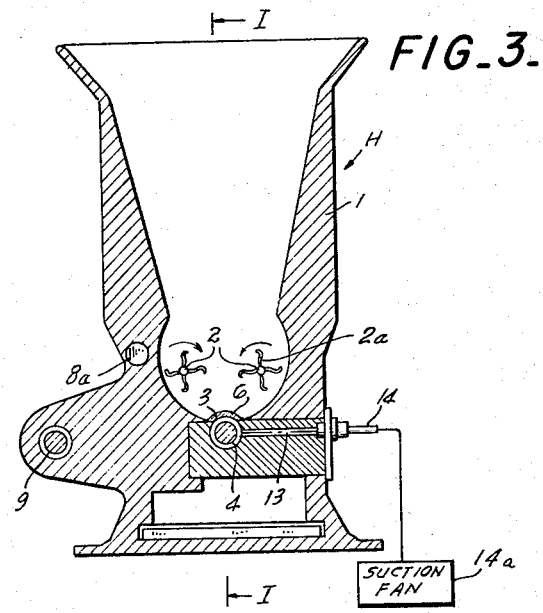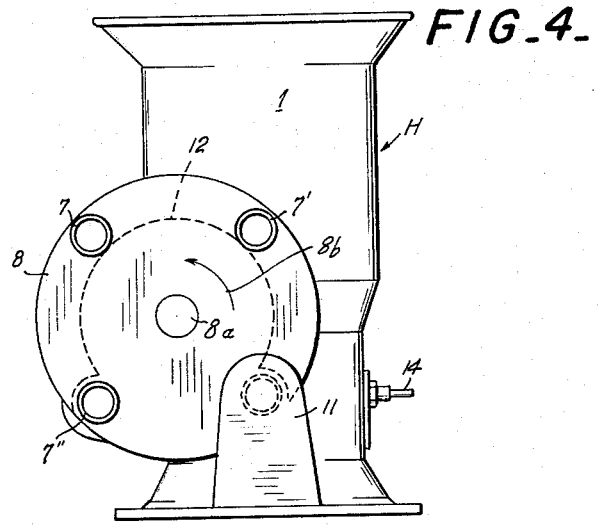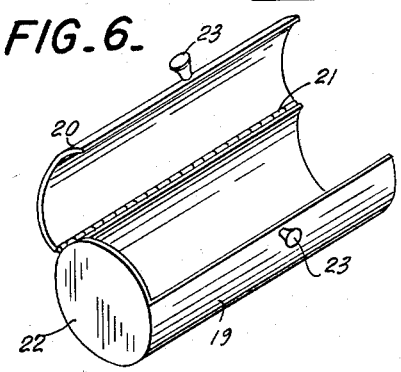

3,283,361
SAUSAGE STUFFING MACHINE
Hans Sommer, Mutterstadterstr. 34, Mannheim,
Rheinau, Germany
Filed Nov. 17, 1964, Ser. No. 411,791
Claims priority, application Germany, Nov. 20, 1963,
S 88,345
5 Claims. (Cl. 17—38)

The present invention relates to sausage stuffing machines. More particularly, the invention relates to a machine for stuffing measured quantities of comminuted meat and/or other edible material into casings consisting of prepared intestine or synthetic plastic material.

It is an important object of the invention to provide an improved sausage stuffing machine which is constructed in such a way that it may stuff casings in rapid sequence and in fully automatic way so that the attendant or attendants must only attend to application of fresh casings but need not be concerned with the remaining operations.

Another object of the invention is to provide a stuffing machine which is constructed in such a way that it discharges accurately measured quantities of comminuted material and that such measured quantities are accumulated and transferred in a fully automatic way in accordance with the strictest sanitary regulations.

A further object of the invention is to provide a stuffing machine of the above outlined characteristics which, in addition to forming accurately measured batches of comminuted material for introduction into the casing of a sausage, is equally useful for delivering measured quantities of such material in mass production of ravioli and similar edible products.

An additional object of the invention is to provide a stuffing machine which may be manipulated by semi-skilled or unskilled persons, which is of very simple and rugged construction, which may be refilled with comminuted material while in actual use, and which comprises a small number of moving parts.

Another object of the invention is to provide a stuffing machine which may be rapidly and readily converted for use in the production of different types of sausages and similar stuffed products, which can be readily taken apart to facilitate cleaning and/or inspection of its components, and which may be utilized with equal advantage in households or in mass-producing plants.

Briefly stated, one feature of the present invention resides in the provision of a machine for stuffing comminuted material into tubular casings to form sausages or the like. The machine comprises a refillable receptacle arranged to accommodate a supply of comminuted material, a cylinder provided with a measuring chamber communicating with the receptacle and having an open end, a conveyor for transferring material from the receptacle into the cylinder so that, when filled, the chamber contains a measured quantity of material, a piston movable into the cylinder to perform working strokes and to thereby expel such measured quantities of material through the open end of the chamber, at least two tubular spouts, intermittently operated carrier means for moving the spouts seriatim into registry with the open end of the measuring chamber so that, when the piston performs a working stroke, one of the spouts registers with the open end to receive material from the chamber while another spout is out of registry with the open end, and plunger means movable into the other spout between intermittent operations of the carrier means to expel material into a casing which is applied around the other spout.

The number of spouts will depend on the desired operating speed of the machine, and the machine is preferably provided with a movable shield which seals the measuring chamber from the interior of the receptacle when the piston performs a working stroke.

The novel features which are considered as characteristic of the invention are set forth in particular in the appended claims. The improved stuffing machine itself, however, both as to its construction and the mode of operating the same, together with additional features and advantages thereof, will be best understood upon perusal of the following detailed description of certain specific embodiments with reference to the accompanying drawings, in which:

FIG. 3 is a transverse vertical section as seen in the direction of arrows from the line III—III of FIG. 1;

FIG. 4 is an end elevational view of the machine as seen from the left-hand side of FIG. 1;

FIG. 6 is a perspective view of a protective tube or sleeve which may be used in the machine of FIGS. 1 to 4.

Figure 1:
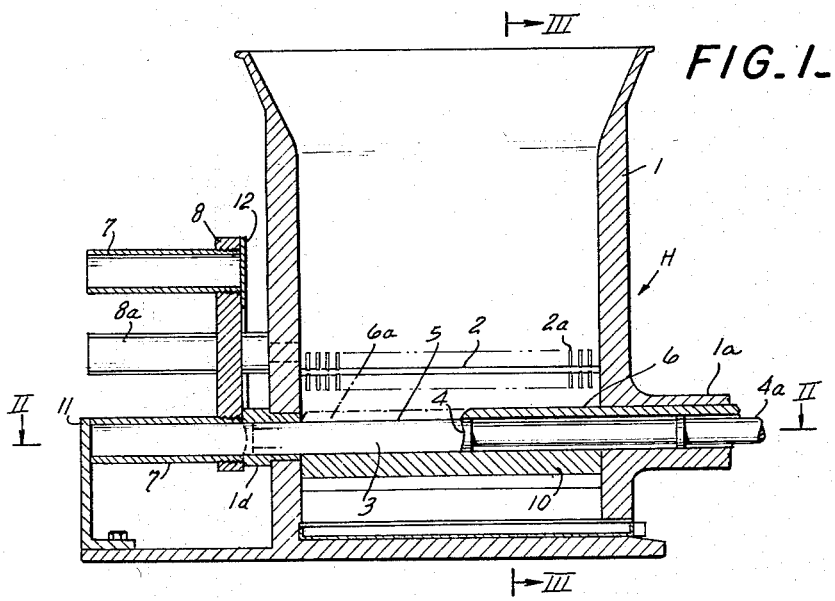
FIG. 1 is a longitudinal vertical section through a sausage stuffing machine which embodies the invention, the section being taken in the direction of arrows as seen from the line I—I of FIG. 3.
Figure 2:
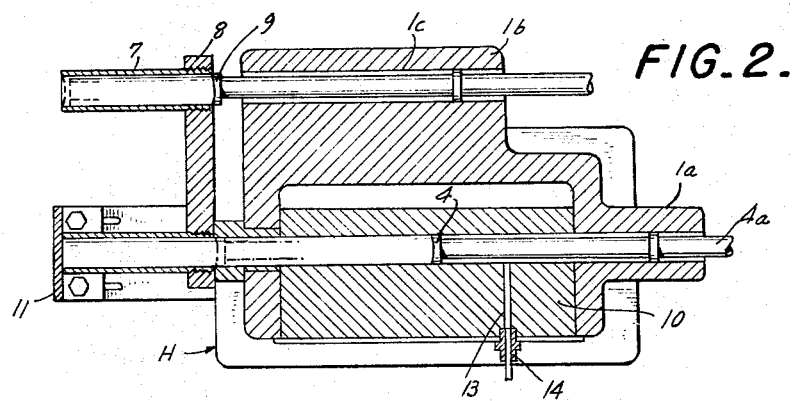
FIG. 2 is a horizontal section substantially as seen in the direction of arrows from the line II—II of FIG. 1.

Referring to the drawings, and first to FIGS. 1 to 4, there is shown a stuffing machine which comprises a housing H defining a receptacle 1 which accommodates a supply of comminuted material, such as comminuted meat or the like capable of forming the stuffing for sausages, ravioli and similar edible products wherein a casing encloses a measured quantity of material. The housing H accommodates a cylinder 10 which, in the illustrated embodiment, is located beneath the internal space of the receptacle 1 and is provided with an elongated measuring chamber 3 capable of accommodating an accurately measured quantity of comminuted material. The upper side of the chamber 3 is open at 5 so that the cylinder communicates with the receptacle, and the chamber 3 is provided with an open end located at the left-hand end of the cylinder, as viewed in FIG. 1. The lower portion of the receptacle 1 supports a conveyor including a pair of parallel horizontal shafts 2 which are provided with paddles 2a serving to feed material through the open side 5 of the cylinder and into the chamber 3. The shafts 2 are driven by a suitable motor, not shown, preferably through the intermediary of a transmission so that the motor may simultaneously operate all other movable parts of the stuffing machine.

The housing H comprises a cylindrical bearing sleeve 1a which guides a reciprocable piston 4 connected to an elongated piston rod 4a. The piston performs intermittent working strokes by moving in a direction to the left, as viewed in FIG. 1, so that its end face transfers a measured quantity of comminuted material from the chamber 3 and into one of a series of tubular spouts 7.

The open side 5 of the chamber 3 may be closed by a reciprocable sealing element in the form of a shield 6 which is synchronized by a conventional drive mechanism with the piston rod 4a in such a way that it shares the return strokes of the piston 4 but is free to perform a working stroke before the piston begins to move toward the open end of the chamber 3. In other words, when the piston is to expel a measured quantity of comminuted material through the open end of the chamber 3, the shield 6 is moved to the phantom-line position 6a and the piston rod 4a is thereupon advanced in a direction to the left to expel the material while the shield 6 seals the chamber 3 from the interior of the receptacle 1.

The spouts 7 are mounted on a rotary carrier 8 here shown as a disk which is mounted on the housing H to rotate about the axis of a shaft 8a. In the illustrated embodiment, the carrier 8 supports four equidistant spouts 7 whose axes are located on the periphery of a circle having its center located on the axis of the shaft 8a. The carrier 8 is rotated intermittently and through such angles that an empty spout 7 is moved into accurate registry with the open end of the chamber 3 when the piston 4 is to begin a working stroke. In other words, whenever the piston 4 expels a measured quantity of comminuted material, such material enters that spout which is aligned with the chamber 3. The means for operating the carrier 8 in stepwise fashion may comprise a suitable transmission, for example, a Geneva transmission of known design and not shown in the drawings. Such transmission may be driven by the motor which reciprocates the piston 4 and which also drives the shafts 2 of the filling conveyor.

The housing H is provided with a laterally projecting portion 1b which defines a horizontal bore 1c parallel with the spouts 7 and with the chamber 3 and accommodating a reciprocable plunger 9 which serves to expel measured quantities of comminuted material from consecutive spouts during the intervals between stepwise rotations of the carrier 8. The angular distance between the spouts 7 is selected in such a way that one of the spouts is aligned with the chamber 7 when another spout registers with the forward end of the bore 1c. The plunger 9 is coupled to the piston rod 4a in such a way that it shares the working strokes of the piston 4 and expels material from the momentarily aligned spout 7″ while the piston 4 expels a measured quantity of material from the chamber 3. The direction in which the carrier 8 rotates is indicated in FIG. 4 by an arrow 8b, and it will be noted that the spouts 7 are moved seriatim, first into registry with the open end of the chamber 3 and subsequently into registry with the open end of the bore 1c. It is clear that the carrier 8 may support only two or three spouts, or five or more spouts, depending on the desired speed of the stuffing machine. If the machine operates at a higher speed, the carrier 8 will be provided with a larger number of spouts so that the operator will have enough time at his or her disposal to apply a tubular casing around the foremost filled spout 7′ before such spout moves into registry with the plunger 9.

The strokes of the piston 4 and plunger 9 may be adjusted in any suitable way to change the quantity of comminuted material which is expelled in response to a working stroke. Thus, the shield 6 may be but need not be withdrawn beyond the solid-line position of FIG. 1, depending on the desired quantity of comminuted material in a batch which is being expelled from the chamber 3 in response to a working stroke of the piston 4. Also, the spouts 7 are simply threaded into or are otherwise readily detachable from the carrier 8 to be replaced by differently dimensioned and/or configurated spouts if the need arises. As a rule, the capacity of a spout should be such that the spout is completely filled with material which is being expelled in response to a working stroke of the piston 4. The cylinder 10 is also removable and may be replaced by a cylinder having a chamber of different capacity. This cylinder may be removed or reinserted as soon as the piston 4 is retracted beyond the right-hand end of the internal space in the receptacle 1. Of course, the piston 4 will be replaced by a differently dimensioned piston whenever the cylinder 10 is replaced by one having a chamber 3 of different diameter.

The spouts 7 cooperate with a stop plate 11 which is adjustably fixed to the housing H and is located in front of that spout which is in registry with the discharge end of the chamber 3. Thus, when the piston 4 performs a working stroke, the stop plate 11 seals the front end of the aligned spout and prevents uncontrolled escape of comminuted material. A second stop plate 12 is fixed to the housing H behind the carrier 8 and serves to seal the rear ends of all filled spouts 7 excepting the one which is in registry with the plunger 9. As shown in FIGS. 3 and 4, the stop plate 12 is of arcuate shape and extends from the open end of the chamber 3 to the open end of the bore 1c. The manner in which this stop plate 12 is fixed to the housing H is not shown in the drawings. The plate 11 is preferably mounted in such a way that it may be shifted in the axial direction of the chamber 3 so as to be in a position to cooperate with spouts of different length. The plate 12 is of particular advantage when the material is rather brittle and is likely to escape from the spouts in response to stepwise rotation of the carrier 8. It is also clear that the plate 11 may be extended so as to seal the front ends of all spouts but the one which is in registry with the plunger 9.

The cylinder 10 comprises an aerating or venting device including a channel 13 provided in the cylinder body and a nipple 14 which is connected to a suction fan 14a. If desired, the suction fan 14a may be connected to the plate 11 to evacuate air from that spout 7 which registers with the chamber 3.

The stuffing machine of the present invention is operated as follows:

When the piston 4 performs a return stroke and entrains the shield 6 from the phantom-line position 6a, the paddles 2a feed a fresh batch of comminuted material from the receptacle 1 into the chamber 3 and the chamber is completely filled when the piston 4 reaches the end of its return stroke, i.e., this chamber then contains an accurately measured quantity of comminuted material which suffices to form the filling for a sausage. In the next step, the shield 6 is returned to the position 6a to seal the open side 5 of the cylinder 10. The motor then causes the piston 4 to perform a working stroke and to expel the material from the chamber 3, through a connecting nipple 1d, and into that spout 7 whose front end is sealed by the plate 11. The spout now contains an accurately measured quantity of material and the carrier 8 is then operated to move by a step so as to advance the next (empty) spout 7 from registry with the plunger 9 into registry with the nipple 1d. The transmission which rotates the carrier 8 is preferably constructed in such a way that the carrier rotates by a step when the piston 4 performs a return stroke.

The freshly filled spout 7 is now moved to the position 7′, shown in FIG. 4, and the operator or a suitable machine may apply around this spout a tubular casing. In other words, the application of a casing may begin as soon as the freshly filled spout 7′ advances beyond the plate 11.

When the freshly filled spout 7′ reaches the position 7″ (FIG. 4) and registers with the bore 1c, its rear end has moved beyond the plate 12 and may receive the plunger 9 which expels the material into the casing thereon.

Figure 5:
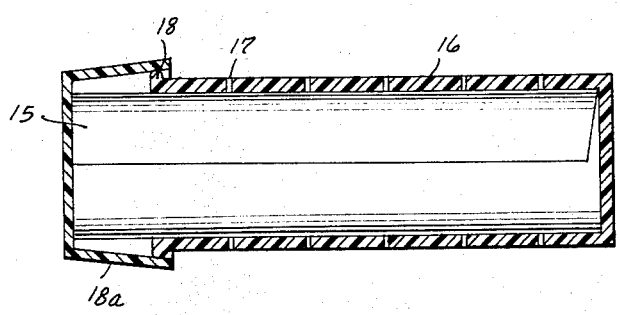
FIG. 5 is an axial section through a three-piece tubular casing which may be stuffed with comminuted material by resorting to the machine of FIGS. 1 to 4.

FIG. 5 illustrates one form of a tubular casing which may be used in the machine of FIGS. 1 to 4. This casing comprises an inner tube 15 of comparatively weak synthetic plastic material and an outer tube 16 which may consist of paper, synthetic plastic, metallic foil or another material capable of withstanding boiling or cooking which is necessary to complete the treatment of material which is entrapped in the casing. The outer tube 16 is preferably formed with small perforations 17 and its open end is provided with a bead 18 which may be connected with a cap 18a. The inner tube 15 is slipped onto a filled spout 7′ and is automatically separated from the spout when the latter reaches the position 7″ and is emptied by the plunger 9. It is clear that the casing of FIG. 5 may be replaced by a conventional casing one end of which is open, and that such casing may consist of prepared intestine.

FIG. 6 illustrates a protective tube which may be applied around the casing, particularly when the stuffing machine operates at a high speed and at elevated pressures. The tube of FIG. 6 consists of metallic or synthetic plastic material and comprises two shells 19, 20 which are connected by a hinge 21 so that they may form a cylindrical mantle which can be fitted around the casing of FIG. 5 or around another natural or synthetic plastic casing. The shell 19 comprises a front end wall 22 and each shell is provided with a handle 23. A single protective tube will ordinarily suffice because, once the casing is separated from that spout (7") which registers with the bore 1c, the protective tube may be separated therefrom and is then applied around that casing which surrounds the spout 7'.

It is clear that the spouts 7 need not be of circular cross section. For example, if the material which fills the receptacle 1 is sufficiently plasticized and is readily deformable, the spouts 7 may be replaced by spouts of rectangular, square or other polygonal cross section. Of course, the plunger 9 is then also replaced by a polygonal plunger capable of expelling material from such polygonal spouts. However, even if the spouts 7 are of non-circular cross section, their capacity preferably equals the capacity of the chamber 3 so that each spout is completely filled when it receives a measured quantity of material.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A machine for stuffing comminuted material into tubular casings to form sausages or the like, comprising, a receptacle arranged to accommodate a supply of comminuted material; a stuffing chamber communicating with said receptacle and having an open end; stuffing means movable in said stuffing chamber to stuff comminuted material through said open end of said stuffing chamber; closing means arranged spaced outside of and opposite to said open end of said stuffing chamber; expelling means arranged transversely spaced from said stuffing chamber; at least two tubular spouts having opposite open ends; intermittently operable carrier means carrying said two tubular spouts movable between a first position in which one of said spouts is located with one open end thereof in registry with said open end of said stuffing chamber and with the other open end thereof closed by said closing means and the other of said spouts is located with one open end thereof in registry with said expelling means and the other open end thereof uncovered by said closing means, and a second position, in which the location of said first and second tubular spouts is reversed; and means for operating said stuffing means and said expelling means when said spouts are in said first and second positions thereof, whereby during each of said operations that spout which is in register with said stuffing chamber is filled with comminuted material by said stuffing means while said comminuted material is retained therein by said closing means and from the other spout which is in register with said expelling means, comminuted material is expelled by said expelling means through the open uncovered end thereof so as to be introduced into a sausage casing.

2. A machine as set forth in claim 1, further comprising conveyor means arranged for transferring material from said receptacle into said stuffing chamber.

3. A machine as defined in claim 1, further comprising securing means detachably securing said spouts to said carrier means.

4. A machine as defined in claim 2, further comprising a sealing element interposable between said stuffing chamber and receptacle so as to alternately establish and interrupt communication of one with the other, said conveyor means transferring material to said chamber when the chamber communicates with said receptacle.

5. A machine as defined in claim 2, further comprising protective sleeve means emplaceable about a sausage casing secured to said other spout, so as to prevent rupture of said casing when said expelling means expels said material from said other spout and into said casing means.

References Cited by the Examiner

UNITED STATES PATENTS

| 661,073 | 11/1900 | Paulitschke et al. | 17—38 |
| 1,693,261 | 11/1928 | Sweetland. | |
| 2,669,749 | 2/1954 | Hovland | 17—35 |
| 2,977,629 | 4/1961 | Grebe | 17—35 X |
| 3,050,771 | 8/1962 | Mylchreest. | |

FOREIGN PATENTS

| 51,399 | 4/1890 | Germany. |

SAMUEL KOREN, *Primary Examiner.*

H. P. DEELEY, JR., *Assistant Examiner.*